United States Patent [19]
Hughes

[11] Patent Number: 5,463,818
[45] Date of Patent: Nov. 7, 1995

[54] WIDE-WIDTH MICROMETER AND METHOD OF USING THE SAME

[75] Inventor: Charles H. Hughes, Poland, Ohio

[73] Assignee: Cold Metal Products, Inc., Youngstown, Ohio

[21] Appl. No.: 220,059

[22] Filed: Mar. 30, 1994

[51] Int. Cl.$^6$ .................................................. G01B 3/18
[52] U.S. Cl. .......................... 33/813; 33/831; 33/549; 33/555
[58] Field of Search .................... 33/501.05, 501.6, 33/549, 555, 567, 567.1, 783, 784, 803, 805, 813, 817, 818, 819, 820, 823, 824, 831

[56] References Cited

U.S. PATENT DOCUMENTS

| | | | |
|---|---|---|---|
| 1,335,004 | 3/1920 | Lehigh | 33/824 |
| 1,829,323 | 10/1931 | Witter et al. | 33/824 |
| 3,142,121 | 7/1964 | Stefanov | 33/501.6 |
| 4,103,427 | 8/1978 | Ledley, III | 33/819 |
| 4,160,326 | 7/1979 | Griesbach | 33/555 |
| 4,972,603 | 11/1990 | Meyer | 33/784 |
| 5,287,631 | 2/1994 | Stade | 33/820 |

*Primary Examiner*—William A. Cuchlinski, Jr.
*Assistant Examiner*—G. Bradley Bennett
*Attorney, Agent, or Firm*—Kane, Dalsimer, Sullivan, Kurucz, Levy, Eisele and Richard

[57] ABSTRACT

A device for measuring a dimension of an object includes a platform with a contact surface and a measuring device. An object to be measured is placed on the platform between the contact surface and the measuring device and held flat by a clamping wedge. In order to obtain a variance of said dimension with respect to a nominal value, a standard having a known length is first placed on the platform and the measuring device is calibrated using the standard.

5 Claims, 2 Drawing Sheets

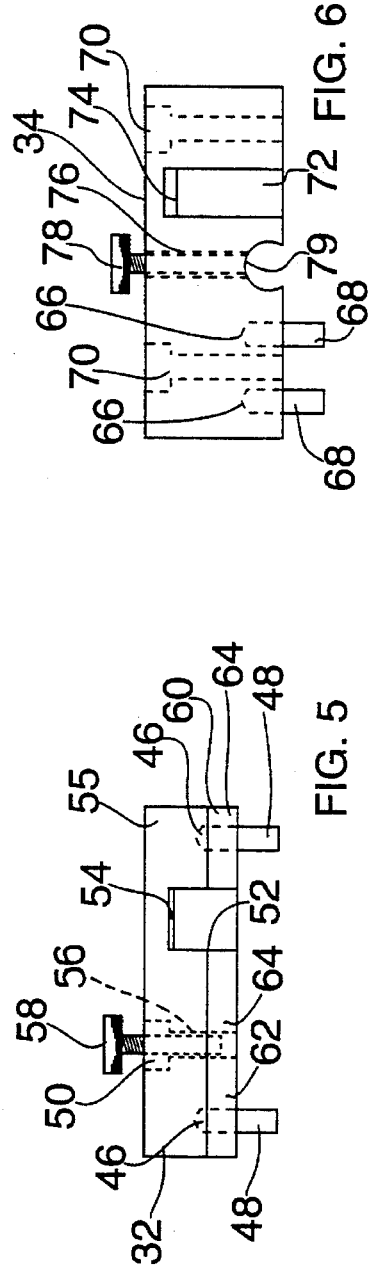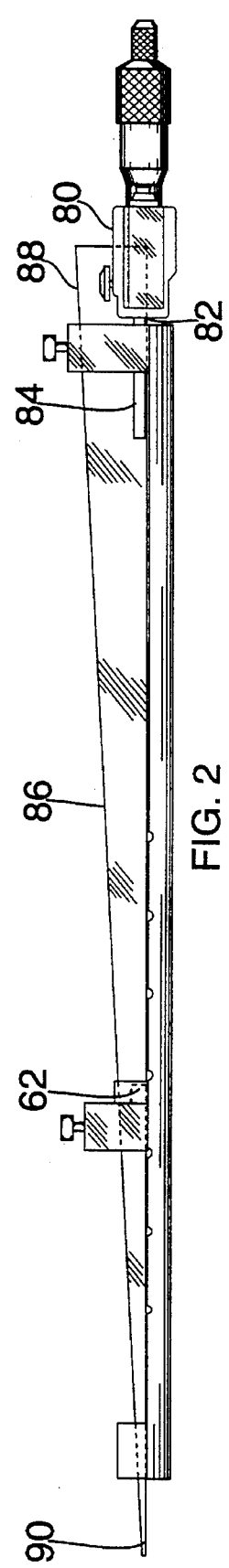

WIDE-WIDTH MICROMETER AND METHOD OF USING THE SAME

BACKGROUND OF THE INVENTION

1. Field of Invention

This invention pertains to a device for measuring accurately a linear dimension of an object and more particularly to a device used for determining whether said linear dimension is within a preselected range or tolerance. The present invention further relates to a method of measuring a linear dimension of an object, such as the width of a metal strip.

2. Description of the Prior Art

The subject device is directed to the art of measuring a linear dimension of objects such as wide, relatively thin metal strips. Typically such strips are made by slitting a metal sheet into strips of selected nominal widths. Normally the tolerances for these dimensions are related to the actual widths of the strips. For example a typical tolerance for a strip of 0.5" to 3" is ±0.005" while for a wider strip in the range of 9–18" the tolerance may be ±0.010 to ±0.016". The width of strips can be measured to determine whether these tolerances are met by using existing micrometers or calipers. However in some instances there is a need for relatively wide strips made to much closer tolerances usually associated with the thin strips. Thus for example in some instances a strip in the range of 9–18" may be required having a tolerance of +0.005". However it is very difficult to determine whether a wide strip has this narrow tolerance with present instruments and measurement techniques. For instance measurement errors can occur if the strip is not measured exactly perpendicularly across its sides or if the measurement instrument has edges which are not positioned parallel to the edges of the strip. In this situation the true width is not the actual width but is equal to the product of the measured dimension and the cosine of the measurement angle. Finally, the measurement is also adversely affected if the strip is held by hand since it is relatively flexible and may bend during the measuring step.

In view of the above-mentioned disadvantages, it is apparent that there is a need for a better device and method for measuring the linear dimension of an object accurately.

OBJECTIVES AND SUMMARY OF THE INVENTION

In view of the above-mentioned disadvantages of the prior art, it is an objective of the present invention to provide a device for measuring accurately the width a relatively wide object.

A further objective is to provide a device in which the width of an object is automatically compared to a standard to determine the variation from a nominal value, independent of the actual width.

Yet another objective is to provide a device which is easy to use and inexpensive to manufacture.

Other objectives and advantages of the invention shall become apparent from the following description. Briefly, a device for measuring width constructed in accordance with this invention includes a platform having a measuring device on one side and a contact surface disposed at a variable distance therefrom. A wedge may be used to hold the strip flat against the platform thereby insuring an accurate measurement. Before the strip is positioned on the platform a commercially available standard may be used to calibrate the sensor whereby the variance in the width of the strip is determined by comparing its actual width to the standard.

BRIEF DESCRIPTION OF THE DRAWINGS

FIG. 1 shows a plan view of a device constructed in accordance with this invention;

FIG. 2 shows a side elevational view of the device;

FIG. 5 shows a right side elevational view of a second block of the device; and

FIG. 6 shows a right side elevational view of a third block of the device.

DETAILED DESCRIPTION OF THE INVENTION

Figures 3, 4:
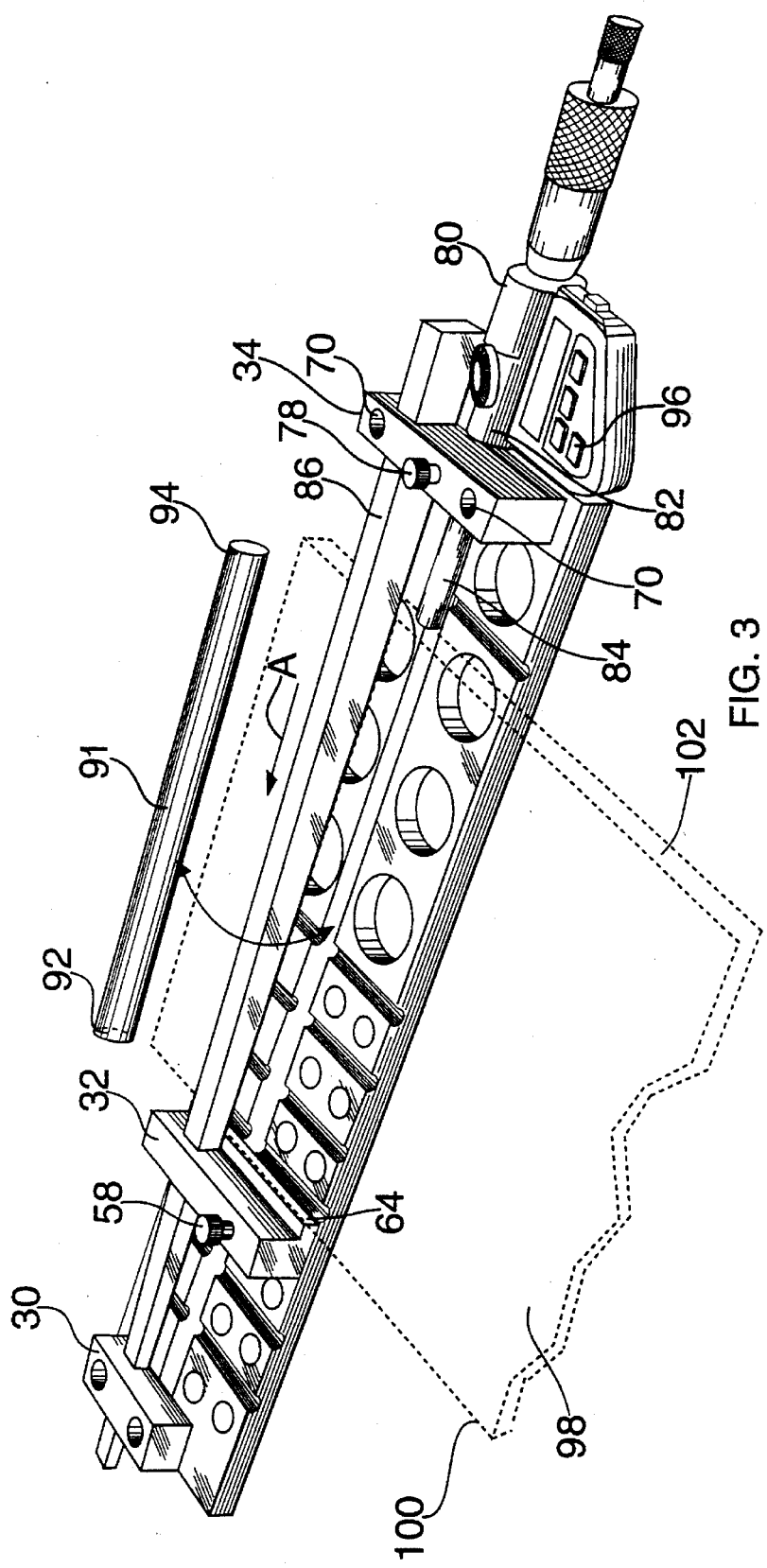
FIG. 3 shows an orthogonal view of the device used to measure a standard and a strip.
FIG. 4 shows a right side elevational view of one of the blocks of the device.

As shown in the Figures, a device 10 includes a platform 12 which is generally flat and has an elongated rectangular shape. On one side, the platform 12 has a plurality of relatively large holes 14 arranged in two parallel rows. The rest of the platform 12 is provided with three rows of much smaller holes. The two rows of holes 16, 18 disposed adjacent to the platform edges 20, 22 respectively preferably have smooth inner surfaces. The third row of holes 24 disposed near the longitudinal axis of the platform are preferably threaded. A plurality of relatively shallow transverse grooves 26 are also provided between the holes as shown. In addition the platform is provided with a V-shaped longitudinal groove 28 extending substantially along its length, especially between holes 14.

The platform 12 is provided with three generally paralelilipedal blocks 30, 32, 34. Block 30 shown in more detail in FIG. 4, is formed with several holes 36 extending upwards for holding steel dowels 38. The block is also provided with a countersunk hole 40 extending through the whole block 30. The block is also formed with a notch 42 extending horizontally through the block 30. Preferably the sidewalls of the notch 42 are slanted as at 44 so that the size of the notch 42 on face 45 of the block 30 is larger than its size on the opposite face (not shown). The block is mounted on the platform 12 by dowels 38 and is secured thereto by a screw (not shown) disposed in hole 40.

Block 32 is similar to block 30 in that it has holes 46 with dowels 48, a countersunk hole 50, and a notch 52. A top surface 54 of notch 52 is slanted downwardly so that the opening of the notch is larger on one face 55 than the opposite face. In addition, block 32 is also provided with a threaded hole 56 holding a set screw 58. Finally on the bottom of face 55, the block 32 is provided with two strips 60, 62 provided adjacent to notch 52 and made for example of carbide to provide a block contact surface 64. Block 32 may be mounted in any of several preset locations on the platform defined by groves 26. The block 32 is mounted on the platform 12 by dowels 48 disposed in one of the holes 16 and 18 and secured thereto by a screw 58 passing through hole 50 and engaging one of the threaded holes 24.

Block 34 is also provided with holes 66 holding dowels 68, countersunk holes 70, a notch 72 with a slanted surface 74, and a threaded hole 76 with a set screw 78. Hole 76 terminates at an arcuate channel 79 formed on the bottom of the block 34. Block 34 is mounted and secured to platform 12 in the same manner as block 30.

Device 10 further includes a micrometer 80 which may be for example a digital micrometer having SPC (statistical process control) capability. Such micrometers are available for example from the Mitutoyo company as Model No. 350-711. Typically, these micrometers have an extended sleeve 82 which house a movable point 84 used for taking measurements. The micrometer 80 is positioned so that its sleeve 82 is inserted into the channel 79 of block 34 with the point 84 extending into the V-shaped notch 28 of the platform 12. The point 84 can be moved longitudinally by a preselected distance of for example one inch. The micrometer 80 is maintained in this position by set screw 78.

The device 10 further includes a clamping wedge 86. Wedge 86 is generally triangular-shaped having one end 88 higher than tip 90. Wedge 86 is shaped and constructed to slide through notches 72, 52, 42 of the blocks 34, 32, 30 respectively.

Preferably the platform 12 is made of aluminum or an aluminum alloy, while blocks 30, 32, 34 and wedge 86 are made of steel.

The device 10 is used as follows: first block 32 is secured on platform 12 at a distance from block 34 which is slightly larger than the nominal width of a strip that must be measured but within the range of movement of the micrometer point 84. Next the micrometer is calibrated for the nominal width of the strip. This calibration may be accomplished for example by using a metallic rod having flat ends and a precise length equal to the nominal width of a strip to form a standard 91. The rod is available commercially for various standard strip widths. The standard 91 is placed into groove 28 so that one of its ends 92 abuts the contact surface 64 of block 32. The micrometer point 84 is then advanced until it touches the opposite end 94 of standard 91. The micrometer is then set to zero, for example by pushing one of its buttons 96.

Next, the standard 91 and the wedge 86 are removed from the platform, and the point 84 is retracted. The strip 98 to be measured is positioned on the platform 12 with one of its edges 100 abutting and resting against contact surface 64. The wedge is inserted through the notches of the blocks in a sliding movement in direction indicated by arrow A in FIG. 3. The slanted surfaces of the notches insure that the wedge is properly aligned and force the wedge against the strip 98 thereby clamping the strip 98 and insuring that the strip 98 remains flat during measurement with its sides 100, 102 being perfectly parallel to the contact surface 64. Once the wedge 86 is fully inserted, the point 84 of the micrometer is advanced until it touches edge 102 of the strip 98. Because the micrometer has been previously calibrated to the nominal width of the strip, the reading of the micrometer now indicates the variance of width from its nominal value. The actual width of the strip is equal to the length of the standard plus or minus the variance.

After the reading is completed, the wedge is slid out at least partially to allow the strip 98 to be moved longitudinally so that another reading or measurement can be taken of its width at a different location along the strip. After all the readings on the strip have been completed, the wedge is removed and the strip is lifted off, for example by pushing the strip upward through holes 12.

Obviously numerous modifications may be made to this invention without departing from its scope as set forth in the appended claims.

I claim:

1. A device for measuring the width of an elongated metal strip comprising:

a platform having a first and a second end;

a micrometer mounted on said first end;

a block having a contact surface;

clamping means for clamping said strip against said platform during measurement, said clamping means including a wedge, a first clamping member disposed at said first end and a second clamping member disposed at said second end, said first and second members cooperating to engage said wedge; and mounting means for mounting said block at a variable distance from said micrometer wherein said width is measured by placing said strip on said platform with one strip edge abutting said contact surface and a second strip edge in contact with said micrometer.

2. The device of claim 1 wherein said mounting means includes positioning means for positioning said block at one of several preselected locations on said platform.

3. The device of claim 1 wherein said micrometer is mounted on said first clamping member.

4. The device of claim 3 wherein said first and second clamping members have slanted surfaces engaging said wedge.

5. The device of claim 1 wherein said platform is formed with a longitudinal groove for holding a standard for calibrating said micrometer.

\* \* \* \* \*